Sept. 6, 1960  R. A. BURDICK  2,951,480
INHALATOR
Filed April 10, 1959
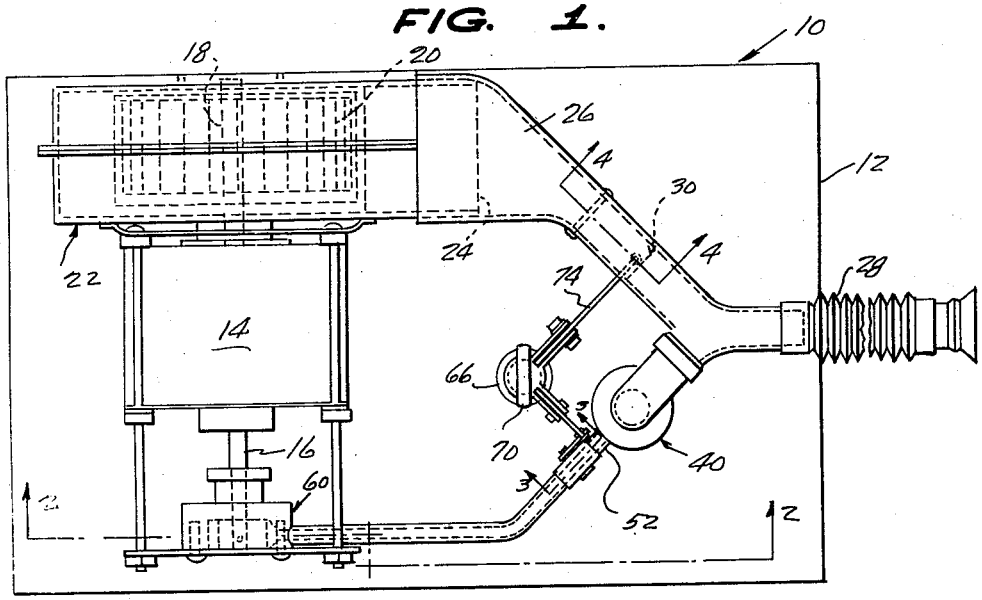
INVENTOR.
RAY A. BURDICK,
BY
McMorrow, Berman & Davidson
ATTORNEYS.

United States Patent Office 2,951,480
Patented Sept. 6, 1960

2,951,480
INHALATOR
Ray A. Burdick, 507 Orondo Ave., Wenatchee, Wash.
Filed Apr. 10, 1959, Ser. No. 805,549
6 Claims. (Cl. 128—194)

The present invention relates to an inhalator for administering a therapeutical substance in gaseous or vapor form to an individual for treatment of a respiratory disease or disorder.

Previously proposed and presently in use are vaporizers and inhalators which are arranged to operate continuously when started, and which produce a flow of air carrying a therapeutic liquid disbursed in the air in mist form. Generally, individuals with respiratory diseases or disorders do not require inhalation of the prescribed medicant with every intake of the breath and consequently, when the flow of air and therapeutic liquid in this form is continuous, the therapeutic liquid and air mixture is vented to atmosphere and wasted. Not only are such vaporizers and inhalators inefficient and wasteful of the prescribed medicant but often the escape or venting of the mist or vapor to atmosphere creates a nuisance and often changes conditions in the area of the individual undergoing treatment.

An object of the present invention is to provide an inhalator which lends itself to producing a therapeutic mist or vapor in an air current in a manner so as to be instantly available on demand to an individual having respiratory disorder or disease and requiring treatment.

Another object of the present invention is to provide an inhalator which lends itself to producing a therapeutic mist or vapor in an air current in an efficient manner and without wastage of the therapeutic liquid which is vaporized or nebulized and mixed in the air current.

A further object of the present invention is to provide an inhalator which is simple in structure, one which may be fabricated of common parts commercially available, one which is economically feasible, and one which is highly effective in action.

These and other objects and advantages of the present invention will be fully apparent from the following description when taken in conjunction with the annexed drawing, in which:

Figure 1 is a plan view of an inhalator according to the present invention, a portion of the mouthpiece tube being broken away;

Figure 2 is a fragmentary view in elevation taken on the line 2—2 of Fig. 1;

Figure 3 is a view on an enlarged scale, taken on the line 3—3 of Figure 1;

Figure 4 is a view on an enlarged scale, taken on the line 4—4 of Figure 1; and

Figure 5 is an isometric view of the means connecting the first and second control means together, removed from the support and shown disconnected from the control means.

Referring in greater detail to the drawing in which like numerals indicate like parts throughout the several views, the reference numeral 10 in Figures 1 and 2 designates generally the inhalator of the present invention. The inhalator 10 includes a base 12 on which is mounted a motor 14 having drive shaft portions 16 and 18 projecting from each end thereof. The shaft portion 18 is shown in dotted lines in Figure 1.

A squirrel cage fan 20 is mounted upon the shaft portion 18 and is indicated by dotted lines in Figure 1. A fan housing 22 surrounds the fan 20 and is provided with an outlet 24 to which is connected one end of a conduit 26 having its other end connected to one end of a mouthpiece structure 28 of conventional construction.

The squirrel cage fan 20 within the housing 22 constitutes a source of air under low pressure and large volume.

A first control means, designated generally by the reference numeral 30, is in the conduit 26 and normally connects the fan housing 22 in communication with the atmosphere. This control means includes a port 32 (Figure 4) in the conduit 26, a flap or closure member 34 normally positioned exteriorly of the conduit 26 and of a size to close the port 32 and normally in a position which is out of closing engagement with the port 32. The control means 30 includes a valve member 36 within the conduit 26 and normally in closing relation with respect to the conduit 26. A link 38 connects the flap or closure member 34 to the valve member 36. Both of the members 34 and 36 are hingedly connected to the conduit 26 for movement from the full line position (Figure 4) in which the source of air under pressure is connected in communication with atmosphere to a position, shown in dotted lines, in which the source of air is connected to the mouthpiece structure 28.

A nebulizer, designated generally by the numeral 40 in Figures 1 and 2, is positioned adjacent the conduit 26 and has an inlet 42 and an outlet 44. The neublizer 40 has a generally ovoid shaped shell 46 provided with a charging orifice 48.

The internal structure of the nebulizer 40 is conventional and includes an air tube 50, shown in dotted lines in Figure 2, having its lower end projecting into the vertically extended part of a conduit 52 and having its upper end extending above the level of a charge of treating liquid, as at 54, contained within the shell 46. A liquid or capillary tube 56 has its lower end anchored in the lower end of the shell 46 and its upper end at a level substantially contiguous with the upper end of the air tube 50. The capillary tube 56 is provided with an opening 58 into which the liquid is drawn responsive to the blast of air through the air tube 50. This construction is conventional and not further detailed for reasons of simplicity.

The conduit 52 has one end connected in communication with the inlets 42 of the nebulizer 40 and the other end connected in communication with an air pump 60 mounted on and driven by the shaft portion 16 of the motor 14.

A second control means is in the conduit 52 and normally connects the air pump 60 with the atmosphere. This control means is shown in section in Figure 3 and is seen to consist in a distributing valve structure 62 having a rotatable thimble 64 movable between a position in which the air pump 60 is connected to the atmosphere, as shown in Figure 3 or, as indicated by dotted lines at 64', to a position in which the air pump 60 is connected to the inlet 42, the section of the conduit 52 connecting the air pump 60 to the valve structure 62 being indicated by the reference numeral 52' in Figures 2 and 3.

Means is provided connecting the closure member 34 and valve member 36 to the thimble 64 of the valve structure 62 for movement from the normal positions in which the interior of the fan housing 22 and the air pump 60 are vented to atmosphere to positions in which the interior of the fan housing 22 is connected in communication with the mouthpiece structure 28 and the air pump 60 is connected to the inlet 42 of the nebulizer 40. This connection means includes a vertically disposed cylindrical support 66 having its lower end fixedly secured to the base 12. A plunger 68 is mounted within the support 66 for reciprocatory upward and downward movement. A handle 70 is provided on the upper end of the plunger 68. A first clamp element 72 is circumposed about the support 66 and a horizontally disposed lever 74 has its intermediate portion connected by a pivot pin 76 to the clamp element 72 for rocking movement about the pin 76 as a horizontal axis. One end of the lever 74 is bifurcated and is received between cooperating collars 78 fixedly secured to the intermediate portion of the plunger 68. The other end of the lever 74 extends beneath the conduit 26 and is connected by a link 80 to the free end portion of the closure member 34.

A second clamp element 82 is circumposed about the support 66. A second lever 84 is horizontally disposed and has its midpart pivotally connected by a horizontal pin 86 to the clamp element 82 for rocking movement about the pin 86 as a horizontal axis. One end of the lever 84 is bifurcated and received between cooperating collars 88 which are secured together and are slidably mounted upon the support plunger 68. A coil spring 90 is circumposed about the portion of the plunger 68 between the slidable collars 88 and a fixed collar 92 which is fixedly secured to the plunger 68. Upon depression of the plunger 68, both of the levers 74 and 84 are tilted so that their free ends move upwardly with the lever 74 shifting the closure member 34 to the position closing the port 32 and with the lever 84 rotating the thimble 64 within the valve structure 62 to the position in which the air pump 60 is connected in communication with the mouthpiece 28. A link 85 operatively connects the lever 84 to the thimble 64. The spring 90 and slidable collars 88 on the plunger 68 provide a lost-motion connection between the valve structure 62 and the plunger 68, thereby causing the first control means to close prior to the valve structure 62.

The air pump 60 (Figure 2) is of conventional construction and includes a housing 94 disposed eccentrically with respect to a rotor 96 mounted on the shaft portion 60. A spring-biased sliding blade 98 carried by the rotor 96 has one end bearing against the inner wall of the housing 94 and when the shaft portion 16 is rotated, the blade 98 pumps air from the housing inlet 100 to the conduit 52'.

In operation, a charge of therapeutic liquid is placed in the nebulizer shell 46 through the orifice 48 and the motor 14 is energized. An individual to be treated may then press the plunger 68 and effect the connecting of the mouthpiece 28 with the blower assembly of the fan 20 in the fan housing 22 and simultaneously connect the nebulizer 40 with the air pump 60 so that the liquid in the nebulizer is vaporized or atomized and blown through the outlet 44 to be mixed with the air from the fan 20 and conveyed through the mouthpiece 28 to the lungs of the individual when the individual inhales. Upon release of pressure from the handle 70, the plunger 68 is returned to its upward movement position under the action of the coil spring 102 which is positioned within the support 66 below the lower end of the plunger which carries a disc 104 against which the spring 102 bears.

When the plunger 68 is released, the closure member 34 and the valve member 36 return to their normal positions diverting the air from the fan 20 to the atmosphere and at the same time shifting the thimble 64 so as to divert air from the air pump 60 to the atmosphere through the exhaust port in the valve structure 62.

It will be seen that the apparatus of the present invention provides a reliable and efficient means of supplying a therapeutic substance to an individual with a respiratory disorder or disease. The individual may inhale the mist or vapor through the mouthpiece 28 with every breath or as often as he likes, each time applying a manual pressure to the handle 70 to depress the plunger 68 and open the conduits 26 and 52 to the respective air pressures.

In place of the fan 20 and the air pump 60, other air pressure means may be substituted if desired and numerous changes and modifications may be made in the valve structures and other components without departing from the spirit of the invention as set forth in the appended claims.

What is claimed is:

1. An inhalator comprising a first source of air under pressure, a first conduit having one end in communication with said source of air, a mouthpiece on the other end of said conduit, a first control means in said conduit normally connecting said air source in communication with the atmosphere, a nebulizer having an inlet and an outlet positioned adjacent said conduit and having the outlet connected in communication with said mouthpiece, a second source of air under pressure, a second conduit having one end in communication with said second source of air and having the other end connected to said nebulizer inlet, a second control means in said second conduit normally connecting said second air source in communication with the atmosphere, and means connecting said first and second control means together for movement from the normal positions in communication with the atmosphere to positions in which they connect said first and second air sources in communication with said mouthpiece and nebulizer respectively.

2. An inhalator comprising a first source of air under pressure, a first conduit having one end in communication with said source of air, a mouthpiece on the other end of said conduit, a first control means in said conduit normally connecting said air source in communication with the atmosphere, a nebulizer having an inlet and an outlet positioned adjacent said conduit and having the outlet connected in communication with said mouthpiece, a second source of air under pressure, a second conduit having one end in communication with said second source of air and having the other end connected to said nebulizer inlet, a second control means in said second conduit normally connecting said second air source in communication with the atmosphere, and means connecting said first and second control means together for movement from the normal positions in communication with the atmosphere to positions in which they connect said first and second air sources in communication with said mouthpiece and nebulizer respectively, said connecting means being movable responsive to hand applied pressure to simultaneously shift said first and second control means from the normal positions in communication with the atmosphere to positions in which they connect said first and second air sources in communication with said mouthpiece and nebulizer respectively.

3. An inhalator comprising a first source of air under pressure, a first conduit having one end in communication with said source of air, a mouthpiece on the other end of said conduit, a first control means in said conduit normally connecting said air source in communication with the atmosphere, a nebulizer having an inlet and an outlet positioned adjacent said conduit and having the outlet connected in communication with said mouthpiece, a second source of air under pressure, a second conduit having one end in communication with said second source of air and having the other end connected to said nebulizer inlet, a second control means in said second conduit normally connecting said second air source in communication with the atmosphere, and means connecting said first and second control means together for movement from the normal positions in communication with the atmosphere to positions in which they connect said first and second air sources in communication with said mouthpiece and nebulizer respectively, said first control means embodying a port in said first conduit, a closure member exteriorly of said first conduit and normally out of closing relation with respect to said port, a valve member in said first conduit adjacent said port and normally in closing relation with respect to said first conduit, said members being connected together for movement from the aforesaid positions to positions closing said port and opening said first conduit respectively.

4. An inhalator comprising a first source of air under pressure, a first conduit having one end in communication with said source of air, a mouthpiece on the other end of said conduit, a first control means in said conduit normally connecting said air source in communication with the atmosphere, a nebulizer having an inlet and an outlet positioned adjacent said conduit and having the outlet connected in communication with said mouthpiece, a second source of air under pressure, a second conduit having one end in communication with said second source of air and having the other end connected to said nebulizer inlet, a second control means in said second conduit normally connecting said second air source in communication with the atmosphere, and means connecting said first and second control means together for movement from the normal positions in communication with the atmosphere to positions in which they connect said first and second air sources in communication with said mouthpiece and nebulizer respectively, said connecting means embodying a vertically disposed support, a plunger mounted in said support for reciprocatory upward and downward movement, a horizontally disposed lever having one end pivotally connected to said plunger and having the other end connected to said first control means mounted on said support for rocking movement about a horizontal axis, and another lever operatively connecting said plunger to said second control means, said plunger being movable responsive to hand applied pressure to simultaneously shift said first and second control means from the normal positions in communication with the atmosphere to positions in which they connect said first and second air sources in communication with said mouthpiece and nebulizer respectively.

5. An inhalator comprising a first source of air under pressure, a first conduit having one end in communication with said source of air, a mouthpiece on the other end of said conduit, a first control means in said conduit normally connecting said air source in communication with the atmosphere, a nebulizer having an inlet and an outlet positioned adjacent said conduit and having the outlet connected in communication with said mouthpiece, a second source of air under pressure, a second conduit having one end in communication with said second source of air and having the other end connected to said nebulizer inlet, a second control means in said second conduit normally connecting said second air source in communication with the atmosphere, and means connecting said first and second control means together for movement from the normal positions in communication with the atmosphere to positions in which they connect said first and second air sources in communication with said mouthpiece and nebulizer respectively, said first control means embodying a port in said first conduit, a closure member exteriorly of said first conduit and normally out of closing relation with respect to said port, a valve member in said first conduit adjacent said port and normally in closing relation with respect to said first conduit, said members being connected together for movement from the aforesaid positions to positions closing said port and opening said first conduit respectively, said connecting means embodying a vertically disposed support, a plunger mounted on said support for reciprocatory upward and downward movement, a horizontally disposed lever having one end pivotally connected to said plunger and having the other end connected to said closure and valve members mounted on said support for rocking movement about a horizontal axis, and another lever operatively connecting said plunger to said second control means, said plunger being movable responsive to hand applied pressure to simultaneously shift said closure and valve members and said second control means from the normal position in communication with the atmosphere to positions in which they connect said first and second air sources in communication with said mouthpiece and nebulizer respectively.

6. An inhalator comprising a first source of air under pressure, a first conduit having one end in communication with said source of air, a mouthpiece on the other end of said conduit, a first control means in said conduit normally connecting said air source in communication with the atmosphere, a nebulizer having an inlet and an outlet positioned adjacent said conduit and having the outlet connected in communication with said mouthpiece, a second source of air under pressure, a second conduit having one end in communication with said second source of air and having the other end connected to said nebulizer inlet, a second control means in said second conduit normally connecting said second air source in communication with the atmosphere, and means connecting said first and second control means together for movement from the normal positions in communication with the atmosphere to positions in which they connect said first and second air sources in communication with said mouthpiece and nebulizer respectively, said first control means embodying a port in said first conduit, a closure member exteriorly of said first conduit and normally out of closing relation with respect to said port, a valve member in said first conduit adjacent said port and normally in closing relation with respect to said first conduit, said members being connected together for movement from the aforesaid positions to positions closing said port and opening said first conduit respectively, said connecting means embodying a vertically disposed support, a plunger mounted on said support for receiprocatory upward and downward movement, a horizontally disposed lever having one end pivotally connected to said plunger and having the other end connected to said closure and valve members mounted on said support for rocking movement about a horizontal axis, and another lever operatively connecting said plunger to said second control means, said plunger being movable downwardly responsive to hand applied pressure to simultaneously shift said closure and valve members and second control means from the normal position in communication with the atmosphere to positions in which they connect said first and second air sources in communication with said mouthpiece and nebulizer respectively, and spring means operatively connected to said plunger urging said plunger to its upward movement position.

References Cited in the file of this patent

UNITED STATES PATENTS

| | | |
|---|---|---|
| 1,312,117 | Hinkle | Aug. 5, 1919 |
| 2,123,334 | Hausmann | July 12, 1938 |
| 2,774,346 | Halliburton | Dec. 18, 1956 |